United States Patent [19]

Chu et al.

[11] Patent Number: 5,229,699
[45] Date of Patent: Jul. 20, 1993

[54] METHOD AND AN APPARATUS FOR PID CONTROLLER TUNING

[75] Inventors: Yao-Tung Chu; Jan-Ku Chen; Wen-Liang Tseng; Ching-Gueg Tseng; Shin-Far Chang; Kwo-Guang Chong, all of Chutung, Taiwan

[73] Assignee: Industrial Technology Research Institute, Chutung, Taiwan

[21] Appl. No.: 776,837

[22] Filed: Oct. 15, 1991

[51] Int. Cl.⁵ .................................... G05B 11/42
[52] U.S. Cl. .................................... 318/610; 364/162
[58] Field of Search .................. 318/561, 609-610; 364/161-163, 180-181

[56] References Cited

U.S. PATENT DOCUMENTS

| | | | |
|---|---|---|---|
| 2,946,943 | 7/1960 | Nye et al. | 318/610 X |
| 3,938,017 | 2/1976 | Hayes | 318/610 |
| 4,390,942 | 6/1983 | de Keizer | 318/610 X |
| 4,415,966 | 11/1983 | Herzog | 318/610 X |
| 4,466,054 | 8/1984 | Shigemasa et al. | 318/610 X |
| 4,539,633 | 9/1985 | Shigemasa et al. | 318/610 X |
| 4,549,123 | 10/1985 | Hagglund et al. | 318/610 |
| 4,587,470 | 5/1986 | Yamawaki | 318/610 X |
| 4,669,040 | 5/1987 | Pettit et al. | 318/610 X |
| 4,749,928 | 6/1988 | Dautremay et al. | 318/610 |
| 4,872,104 | 10/1989 | Holsinger | 318/610 |
| 4,983,898 | 1/1991 | Kanda | 318/610 X |

Primary Examiner—William M. Shoop, Jr.
Assistant Examiner—David Martin
Attorney, Agent, or Firm—Winstead Sechrest & Minick

[57] ABSTRACT

A method for tuning P-, I- and D-type controller which is used in combination or individually to control a variable y of a process in a feedback system, which comprises making the integrating (I) and derivative (D) unit of the controller inoperative; increasing the proportional control gain K until a desired oscillation is obtained; calculating the ultimate gain Ku and ultimate period Tu in accordance with the amplitude and period measured from the oscillation; and setting the parameters of the PID controller in dependence upon the Ku and Tu values, wherein the control signal U resulting from the controller gain K is restricted to a range from a lower limit Umin to an upper limit Umax to avoid the system being operated in an unstable condition. An apparatus suitable for performing the present method is also disclosed.

8 Claims, 2 Drawing Sheets

METHOD AND AN APPARATUS FOR PID CONTROLLER TUNING

FIELD OF THE INVENTION

The present invention relates to a method for PID controller tuning, which can avoid placing the process in a condition of unstability.

BACKGROUND OF THE INVENTION

The proportional (P), integrating (I) and derivative (D) type control is still widely utilized in the present industrial process control due to its simplicity and robustness, even though a variety of theories and control strategies have been developed in the recent years. Moreover, a conventional PID type controller is still being used even if the controller is based on a microcomputer, since persons in the industry skilled in the art have a long and experienced knowledge about the tuning of such PID controllers.

Theoretically, the parameters of a controller can be set at the same time of designing he control system; however, most of the controller parameters are tuned in accordance with the characteristics of the process after the controller is installed. There are two tuning methods which are adapted much more frequently than the other tuning methods in the art, which are a) the method proposed by Ziegler and nichols in 1942, which comprises gradually increasing the P controller gain as the I and D control units are disconnected in a closed loop until the controlled variable undergoes a sustained oscillation, and then calculating the parameters of the PID controller; and b) the step test method which comprises placing the controller in the manual mode and making a small step change in the controller output, approximating the resulting process reaction curve by a simple dynamic model, and then determining the parameters of the controller.

The Ziegler and Nichols method suffers at least the following two disadvantages:

i) It forces the process into a condition of marginal stability which may lead to unstable operation, due to process changes or external disturbances.

ii) The loop-tuning method is quite time-consuming since a trial and error procedure is employed to obtain a sustained oscillation.

The chief disadvantage of the b) method is that the experimental test is performed during open-loop operation and the tuning results will be very sensitive to unanticipated disturbances.

Hagglund and Astrom, in U.S. Pat. No. 4,549,123, disclose an automation method for tuning a PID-type controller, wherein a relay is connected in series to the process in a closed loop P control such that he process is forced into a condition of self-oscillation. This method is much more easier and simple than that of Ziegler and Nichols; however, the fluctuating change between open and close of the relay is not suitable for certain types of process controls, such as fuel flow rate control in a combustion process, because of the safety consideration.

The purpose of the present invention is to provide an improved tuning method for PID controller which does not have the drawbacks described above.

SUMMARY OF THE INVENTION

The present invention provides a method for tuning a PID controller which is used in combination or individually to control a variable y of a process in a feedback system, which comprises making the integrating (I) and derivative (D) unit of the controller inoperative; increasing the proportional control gain K until a desired oscillation is obtained; calculating the ultimate gain Ku and ultimate period Tu in accordance with the amplitude and period measured from the oscillation; and setting the parameters of he PID controller in dependence upon the Ku and Tu values, wherein the control signal U resulting from the controller gain K is restricted to a range from a lower limit Umin to an upper limit Umax to avoid the system being operated in an unstable condition.

The range defined by the Umin and Umax is within a range from a totally shut down condition to a fully loaded condition of a controller output variable, for example a control valve for fuel. Both the Umin and Umax are adjustable in dependence on the nature of the system.

DETAILED DESCRIPTION OF THE INVENTION

In carrying out the tuning method of the present invention, the integrating (I) and derivative (D) modes of a PID controller are first made inoperative and the proportional (P) control gain K is gradually increased until the controlled variable y undergoes an oscillation having an amplitude A and a period T which can be normally detected and measured; and then the ultimate gain Ku and the ultimate period Tu can be calculated according to the measured A and T values in a set of suitable formulas; and finally the parameters of PID controller are set in dependence upon the ultimate gain Ku and ultimate period Tu according to a suitable controller tuning rule.

The ultimate gain Ku and the ultimate period Tu are calculated empirically or analytically depending on the response of the variable y.

When the P control gain K is smaller than the ultimate gain Ku, the response will undergo underdamped oscillation. In this situation, the ultimate gain Ku and the ultimate period Tu can be calculated by using a set of suitable correlation formulas, if the amplitude ratio AR of the first and second peak is known and the period T of he first cycle is measured.

When the P control gain K is equal to the ultimate gain Ku, the system will be brought into ultimate cycle oscillation. It is well known that the controller gain K is now equal to the ultimate gain Ku and the period T is the ultimate period Tu.

When the P control gain K is greater than Ku, the control signal U will be saturated due to a limiter having a range of Umin-Umax connected to the process. If the process has a transfer function $G(S)$, and the limiter and the controller have a describing function N(A), there exists at least one set of amplitude A and frequency $\omega$ for a system having at least second-order high or having time delay model such that $$1+(G(jw)\cdot N(A)=0$$

and $Ku=N(A), Tu=2\pi/\omega$.

The present method is started with a relative small P control gain K, and the ultimate gain Ku and the ultimate period Tu are obtained empirically from the underdamped oscillation. The controller settings are then calculated using, for example the Ziegler and Nichols rules. Preferably, the Ku obtained from the under damped oscillation is once again used as a new controller gain to bring the system into ultimate cycle oscillation and then a set of new Ku and Tu can be calculated, if the system is susceptible of this ultimate cycle oscillation. In our experiments, the ultimate gain Ku and the ultimate period Tu obtained from the under damped oscillation agree very well with those from the ultimate cycle oscillation if the amplitude ratio AR is higher than 0.1.

Figure 1:
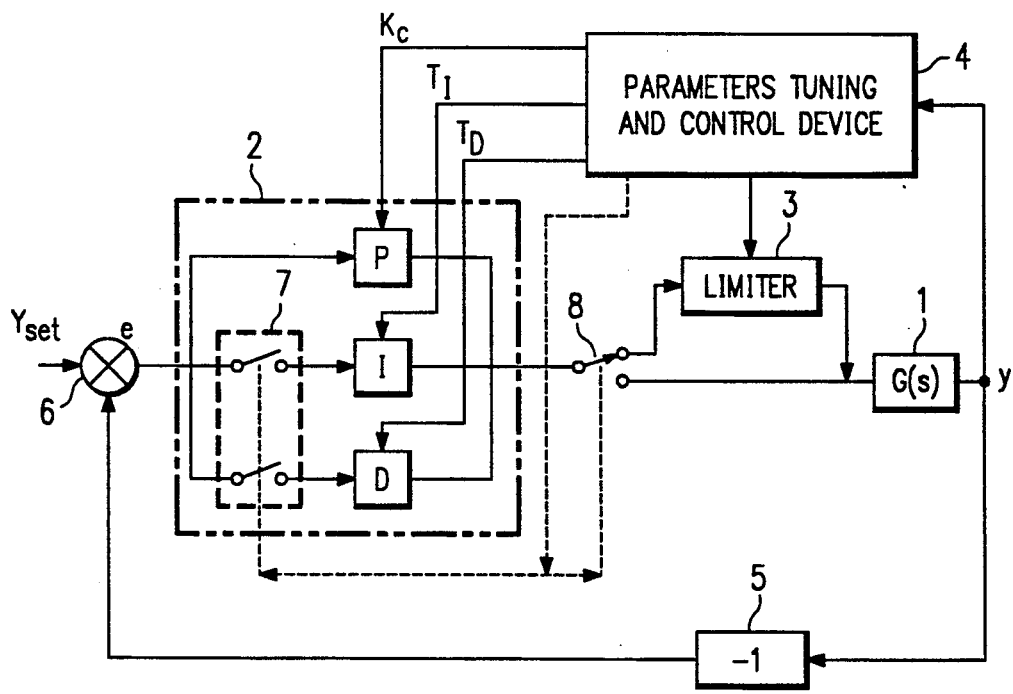
FIG. 1 is a block diagram of one of the preferred embodiments of the present invention.

FIG. 1 is a block diagram of one of the preferred embodiments of the present invention. The process 1 having a transfer function G(S) is controlled by PID-type controller 2 in respect of a process variable y, wherein the actual value of y of the variable is obtained on an output from the process 1 and is fed back over a negative feed-back loop 5 to a summing junction 6 and is combined with a set value of yset for generating an error signal e which is supplied to the controller 2 for generating a control signal U, and this control signal U is sent to the process 1 to complete the control loop.

Generally the following relationship holds between the error signal e and the control signal U of the controller:

$$U = K_c \cdot \left( e + 1/T_I \cdot \int e\,dt + T_D \frac{de}{dt} \right)$$

Wherein $K_c$, $t_I$ and $T_D$ are named as gain, integrating time and derivative time respectively.

For tuning the PID controller by means of the method of Ziegler and Nichols, the closed-loop system is forced to cycle continuously at the point of instability by tuning out the integrating and derivative actions of the controller and gradually increasing the proportional gain K. The proportional gain K at this point is the ultimate gain Ku and the period of oscillation is the ultimate period Tu. Suggested controller settings are listed as follows

| Control action | Gain $K_c$ | Integrating time ($T_I$) | Derivative time ($T_D$) |
|---|---|---|---|
| P | 0.5 Ku | | |
| PI | 0.45 Ku | 0.83 Tu | |
| PID | 0.6 Ku | 0.5 Tu | 0.12 Tu |

The Ziegler and Nichols method requires a time consuming trial and error procedure and the system is forced into a condition of unstability. On the contrary, only one experiment test having an amplitude ratio AR higher than 0.1 is sufficient for the present tuning method. In addition, the system is prevented from operating at a point of unstability due to a limiter 3 having a predetermined smaller range being connected in series to the controller output terminal.

As shown in FIG. 1, the P control gain K is increased by a parameters tuning and control device 4 according to the response y observed, such that the system is brought into an oscillation having an amplitude ratio AR greater than 0.1. The ultimate gain Ku and ultimate period Tu is then calculated according to the amplitude ratio observed with a set of correlation formulas developed by the present inventors. Moreover, the range of Umin-Umax of the limiter 3 may be adjusted via the parameters tuning and control device 4.

Figure 2:
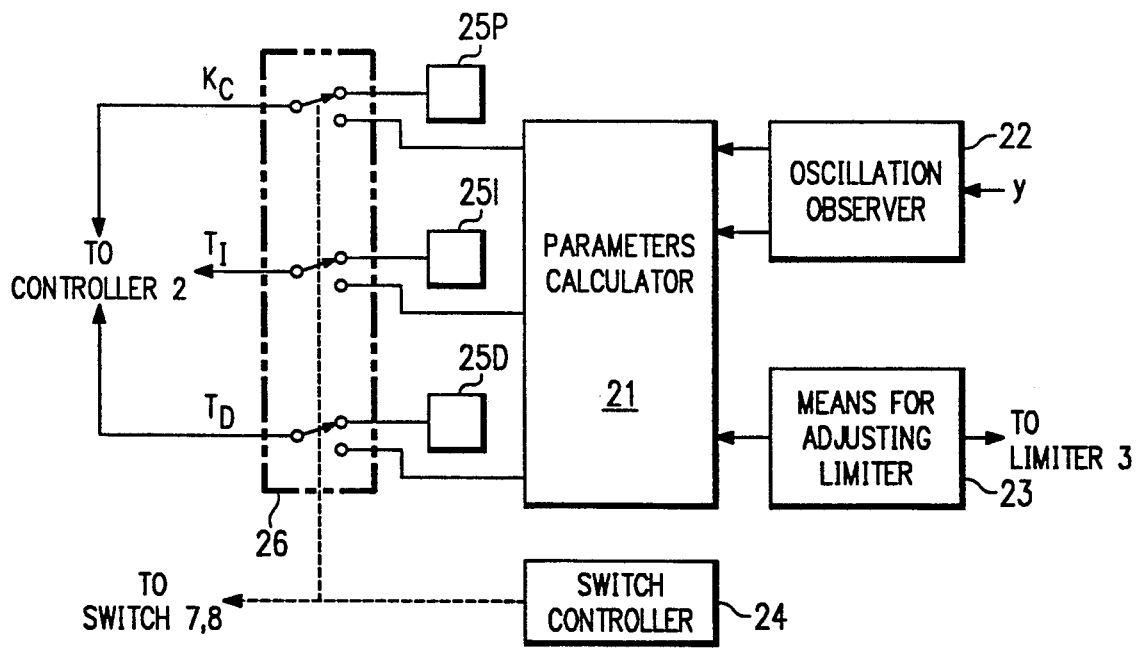
FIG. 2 is a block diagram which illustrate a the parameters tuning and control device 4 in FIG. 1.

Referring to FIGS. 1 and 2, the present tuning method comprises a) disconnecting the I and D function, and connecting the limiter 3 with the controller 2 by sending signals from the switch controller 24 to the switches 7, 8 respectively;

b) increasing the P control gain K until the ultimate gain Ku and ultimate period Tu are calculated through the operations of the oscillation observer 22 and parameters calculator 21, and calculating $K_C$, $T_I$ and $T_D$ values in parameters calculator 21;

C) setting the parameters of P, I and D control unit according to the calculated $K_C$, $T_I$ and $T_D$ values by using the adjusting means 25P, 25I and 25D, respectively; and D) actuating the I and D function, disconnecting the limiter 3 with the controller 2, and connecting 25P 25I and 25D with the controller 2 by sending signals from the switch controller 24 to the switches 7, 8 and 26 respectively.

The range of limiter 3 may be adjusted by the means for adjusting limited 23 in controlling a different variable or process.

Figure 3:
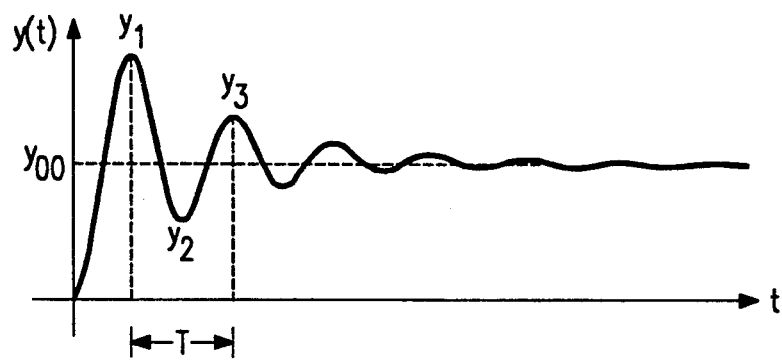
FIG. 3 is a plot which shows the response of the controlled variable y.

FIG. 3 shows a response of the variable y, with a P control gain K, wherein the amplitude ratio AR of the oscillation is defined as follows $$AR=(y_3-y_\infty)/y_1-y_\infty)$$

wherein $y_\infty=(y_3-y_2^2)/(y_1+y_3-2y_2)$; and $y_1$, $y_2$ and $y_3$ are the first peak, the first minimum and the second peak of the output response, respectively.

In order to have a good approximation of the Ku and Tu calculated in the step b), the amplitude ratio AR must be higher than 0.1.

For AR<0.95, Ku and Tu are calculated according to the following correlations:

$$Ku/K=a\cdot\log(AR)+1$$

$$Tu/T=b\cdot\ln(AR)+1$$

wherein T is the period of the oscillation, i.e. the time difference of $y_1$ and $y_3$; a, b are constants, preferably a=0.75, b=$\pi$2.

For AR$\geq$0.95, Ku and Tu are calculated by the following formulas:

$$Ku = K, Tu = T, \text{ if } Z/A \geq 1;$$

or $$Ku = 2K/\pi \cdot [\sin^{-1}(Z/A) + Z/A \sqrt{1 - (Z/A)^2}],$$

-continued $$Tu = T, \text{ if } Z/A < 1$$

wherein $A = A_l - y_\infty$, $Z = (Umax-Umin)2/K$.

Figure 4:
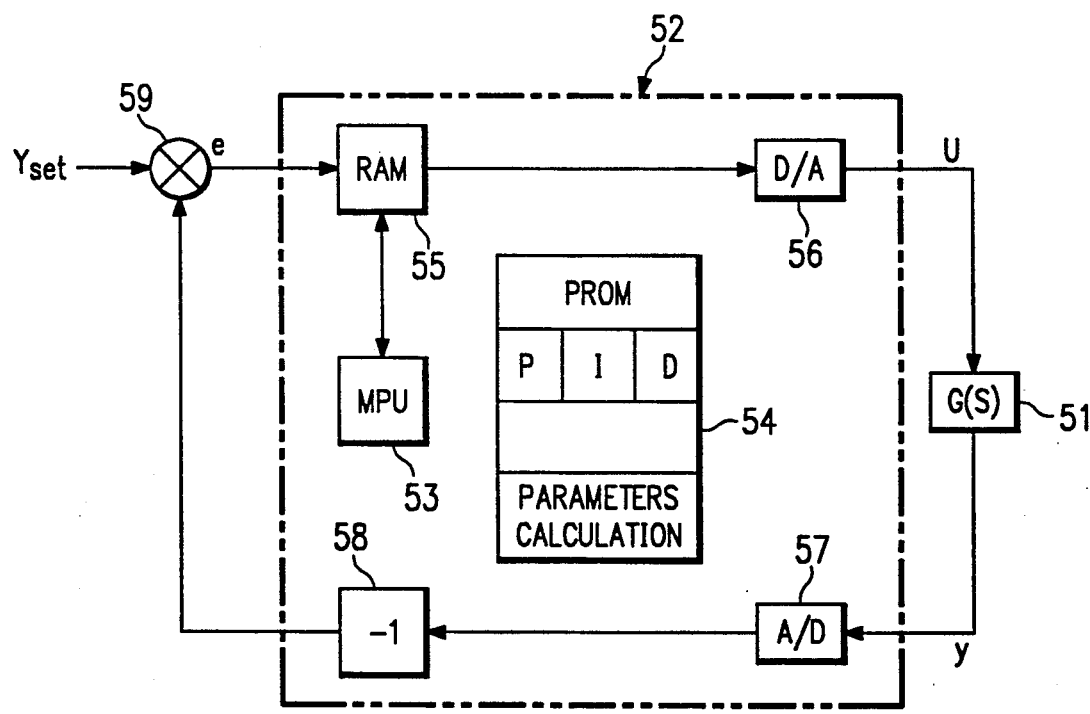
FIG. 4 is a block diagram showing the embodiment of FIG. 1 based on a microcomputer.

The PID controller may be built using a microcomputer. FIG. 4 a block diagram showing the system of FIG. 1 implements a controller comprising a microcomputer 52. On its input the microcomputer has an A/D-converter 57 and on its output a D/A-converter 56. Moreover, there is a microprocessor unit (MPT) 53, a programmable read only memory (PROM) 54 serving as a program storage and a ramdom access memory (RAM) 55 for buffering data. The units of 53-55 of the microcomputer 52 are combined to cooperate in a known manner. The control functions for P-, I- and D-control unit are stored in the PROM 54 together with the functions of the limiter 3, the parameters tuning and control device 4 and any other software required by the microcomputer for its operation. The y of the process 51 is converted to a digital signal by A/D-converter and is fed back over a negative feed-back loop 58 to a summing junction 59 and is combined with a set value of yset for generating an error signal e which is supplied to the units 53-55 for generating a control signal U, and this control signal U is converted to an analytic signal and is sent to the process 51 to complete the control loop.

What is claimed is:

1. A method for tuning P-, I- and D-type controller which is used in combination or individually to control a variable y of a process in a feedback system, which comprises making the integrating (I) and derivative (D) unit of the controller inoperative; increasing the proportional control gain K until a desired oscillation is obtained; calculating the ultimate gain Ku and ultimate period Tu in accordance with the amplitude and period measured from the oscillation; and setting the parameters of the PID controller in dependence upon the Ku and Tu values, wherein the control signal U resulting from the controller gain K is restricted to a range from a lower limit Umin to an upper limit Umax to avoid the system being operated in an unstable condition.

2. The method according to claim 1, wherein the oscillation has an amplitude ratio AR higher than 0.1, and the amplitude ratio is defined as follows $$AR = (y_3 - y_\infty)/(y_l - y_\infty)$$

wherein
$Y_\infty = (y_1 y_3 - y_2^2)/(Y_1 + y_3 - 2y_d)$; and
$y_1$, $y_2$ and $y_3$ are the first peak, the first minimum and the second peak of the output response, respectively.

3. The method according to claim 2, wherein the ultimate gain Ku and the ultimate period Tu are calculated as follows
for AR < 0.95, the Ku and Tu are calculated according to the following correlations:

$$Ku/K = a \cdot \log(AR) + 1$$

$$Tu/T = b \cdot \ln(AR) + 1$$

wherein T is the period of the oscillation; a, b are constants;
for AR ≥ 0.95, the Ku and Tu are calculated by the following formulas:

$$Ku = K, Tu = T, \text{ if } Z/A \geq 1;$$

-continued or $$Ku = 2K/\pi \cdot [\sin^{-1}(Z/A) + Z/A \sqrt{1 - (Z/A)^2}],$$

$$Tu = T, \text{ if } Z/A < 1$$

wherein $A = y_l - y_\infty$, $Z = (Umax-Umin)/2K$.

4. The method according to claim 3, wherein a = 0.75, b = $\pi$/2.

5. An apparatus for tuning P-, I- and D-type controller which is used in combination or individually to control a variable y of a process in a feedback system, which comprises
means for adjusting the proportional control gain K according to the response of the variable y until a desired oscillation is obtained, calculating the ultimate gain Ku and ultimate period Tu in accordance with the amplitude and period measured from the oscillation, and setting the parameters of the PID controller in dependence upon the Ku and Tu values,
a limiter having a range from a lower limit Umin to an upper limit Umax for restricting the control signal U within the range; and
a switch control for temporarily disconnecting the I and D control unit with the process, connecting said means to the process and connecting he limiter to the output terminal of the controller during the tuning procedure.

6. The apparatus according to claim 5, wherein the PID controller comprises a microcomputer in which the control functions of the controller are realized by means of algorithms, and the functions of said means, said limiter and said switch control are realized by means of algorithms containing the microcomputer.

7. A method for tuning P-, I- and D-type controller which is used in combination or individually to control a variable y of a process in a feedback system, which comprises making the integrating (I) and derivative (D) unit of the controller inoperative; increasing the proportional control gain K until a desired oscillation is obtained; calculating the ultimate gain Ku and ultimate period Tu in accordance with the amplitude and period measured from the oscillation; and setting the parameters of the PID controller in dependence upon the Ku and Tu values, wherein the control signal U resulting from he controller gain K is restricted to a range from a lower limit Umin to an upper limit Umax to avoid the system being operated in an unstable condition, the oscillation having an amplitude ratio AR higher than 0.1, and the amplitude ratio being defined as follows $$AR = (y_3 - y_\infty)/(y_l - y_\infty 0$$

wherein
$y_\infty = (y_1 y_3 - y_2^2)/(y_1 + y_3 - 2y_2)$; and
$y_2, y_2$ and $y_3$ are the first peak, the first minimum and the second peak of the output response, respectively,
and the ultimate gain Ku and the ultimate period Tu are calculated as follows
for AR < 0.95, the Ku and Tu are calculated according to the following correlations:

$$Ku/K = a \cdot \log(AR) + 1$$

$Tu/T = b \cdot \ln(AR) + 1$ wherein T is the period of the oscillation; a, b are constants;

for $AR \geq 0.95$, the Ku and Tu are calculated by the following formulas:

$Ku = K, Tu = T, \text{ if } Z/A \geq 1;$ or $Ku = 2K/\pi \cdot [\sin^{-1}(Z/A) + Z/A \sqrt{1 - (Z/A)^2}],$ $Tu = T, \text{ if } Z/A < 1$ wherein $A = y/y_\infty$, $Z = (U\max - U\min)/2K$.

8. The method according to claim 7, wherein $a = 0.75$, $b = \pi/2$.

* * * * *

UNITED STATES PATENT AND TRADEMARK OFFICE
CERTIFICATE OF CORRECTION

PATENT NO. : 5,229,699
DATED : July 20, 1993
INVENTOR(S) : Yao-Tung Chu, Jan-Ku Chen, Wen-Liang Tseng, Ching-Gueg Tseng, Shin-Far Chang, Kwo-Guang Chong It is certified that error appears in the above-indentified patent and that said Letters Patent is hereby corrected as shown below:

Column 1, line 23, change "he" to --the--.

Column 1, line 29, delete "nichols" and insert --Nichols--.

Column 1, line 57, change "he" to --the--.

Column 2, line 12, change "he" to --the--.

Column 2, line 28, delete "illustrate a" and insert --illustrates--.

Column 2, line 59, change "he" to --the--.

Column 3, line 43, after "are" insert --constants and--.

Column 4, line 35, delete "limited" and insert --limiter--.

Column 4, line 44, change "$Yoo=(Y_3-Y_2^2)$" to --$Yoo=(Y_1 Y_3-Y_2^2)$--.

Column 5, line 10, change "(MPT)" to --(MPU)--.

Column 5, line 50, change "$Yoo=(Y_1 Y_3-Y_2^2)/Y_1+Y_3-2yd)$" to --$Yoo=(Y_1 Y_3-Y_2^2)/Y_1+Y_3-2Y_2)$--.

UNITED STATES PATENT AND TRADEMARK OFFICE
CERTIFICATE OF CORRECTION

PATENT NO. : 5,229,699

DATED : July 20, 1993

INVENTOR(S) : Yao-Tung Chu, Jan-Ku Chen, Wen-Liang Tseng, Ching-Gueg Tseng, Shin-Far Chang, Kwo-Guang Chong It is certified that error appears in the above-indentified patent and that said Letters Patent is hereby corrected as shown below:

Column 6, line 29, change "he" to --the--.

Column 6, line 49, change "he" to --the--.

Column 6, line 55, delete "$AR=(y_3-y_{oo})/y_1-y_{oo}0$" and insert --$AR=(y_3-y_{oo})/y_1-y_{oo})$--.

Column 6, line 59, change the first occurrence of "$y_2$" to --$y_1$--.

Column 8, line 8, change "$A=y/y_{oo}$" to --$A=y_1-y_{oo}$--

Signed and Sealed this

Twenty-sixth Day of April, 1994

Attest:

BRUCE LEHMAN

Attesting Officer

Commissioner of Patents and Trademarks